(12) United States Patent
Fosdike et al.

(10) Patent No.: US 12,054,134 B2
(45) Date of Patent: Aug. 6, 2024

(54) BRAKE CONTROLLER MOUNTED TO A TOWING VEHICLE

(71) Applicant: Redarc Technologies Pty Ltd., Morphett Vale (AU)

(72) Inventors: Timothy Fosdike, Torrens Park (AU); Nathan Kuchel, Morphett Vale (AU); Jerry Wang, Panorama (AU)

(73) Assignee: Redarc Technologies Pty Ltd., South (AU)

( * ) Notice: Subject to any disclaimer, the term of this patent is extended or adjusted under 35 U.S.C. 154(b) by 336 days.

(21) Appl. No.: 17/489,379

(22) Filed: Sep. 29, 2021

(65) Prior Publication Data

US 2022/0105912 A1 Apr. 7, 2022

Related U.S. Application Data

(60) Provisional application No. 63/086,201, filed on Oct. 1, 2020.

(51) Int. Cl.
| | | |
|---|---|---|
| *B60T 8/58* | (2006.01) | |
| *B60R 16/023* | (2006.01) | |
| *B60R 16/03* | (2006.01) | |
| *B60T 7/20* | (2006.01) | |
| *B60T 8/88* | (2006.01) | |
| *B60T 8/92* | (2006.01) | |
| *H01R 31/06* | (2006.01) | |
| *B60Q 1/34* | (2006.01) | |
| *B60Q 1/44* | (2006.01) | |

(52) U.S. Cl.
CPC .............. *B60T 8/58* (2013.01); *B60R 16/023* (2013.01); *B60R 16/03* (2013.01); *B60T 7/20* (2013.01); *B60T 8/885* (2013.01); *B60T 8/92* (2013.01); *H01R 31/06* (2013.01); *B60Q 1/34* (2013.01); *B60Q 1/44* (2013.01); *H01R 2201/26* (2013.01)

(58) Field of Classification Search
CPC ... B60T 8/58; B60T 7/20; B60T 8/885; B60T 8/92; B60R 16/023; B60R 16/03; H01R 31/06; H01R 2201/26; B60Q 1/34; B60Q 1/44

See application file for complete search history.

(56) References Cited

U.S. PATENT DOCUMENTS

| | | | |
|---|---|---|---|
| 2010/0152989 A1* | 6/2010 | Smith | B60T 7/085 303/20 |
| 2018/0079375 A1* | 3/2018 | Cekola | B60Q 1/0094 |
| 2019/0111899 A1* | 4/2019 | Lange, III | H01R 13/665 |

\* cited by examiner

*Primary Examiner* — Jacob M Amick
(74) *Attorney, Agent, or Firm* — Fish & Richardson P.C.

(57) ABSTRACT

The present invention relates to a brake controller for a towed vehicle braking system, including a housing or a loom, including an input connector for electrical connection to a towing vehicle and an output connector for electrical connection to a towed vehicle.

24 Claims, 11 Drawing Sheets

BRAKE CONTROLLER MOUNTED TO A TOWING VEHICLE

CROSS-REFERENCE TO RELATED APPLICATIONS

This application claims the benefit under 35 U.S.C. § 119(e) of U.S. Patent Application No. 63/086,201, entitled "BRAKE CONTROLLER MOUNTED TO A TOWING VEHICLE," filed Oct. 1, 2020. The disclosure of the foregoing application is incorporated herein by reference in its entirety for all purposes.

TECHNICAL FIELD

The present invention relates to a brake controller for a towed vehicle braking system. The brake controller includes a housing or a loom including an input connector for electrical connection to a towing vehicle and an output connector for electrical connection to a towed vehicle.

BACKGROUND OF INVENTION

Towed vehicles such as trailers of various classes have different braking systems. Commonly, trailers with weights between 750 kg and 4.5 tons have electromagnetic braking systems or hydraulic braking systems controlled by electromagnetic actuators. For both of these systems, the braking of the trailer is controlled by an electrical signal from a towing vehicle.

Brake controllers may be used to generate the electrical signal to better control operation of the towed vehicles braking systems. For example, an existing type of brake controller is mounted in the towing vehicle and hardwired into the towing vehicle wiring system so as to receive a braking signal from the towing vehicle and to subsequently generate an electrical signal instructing the operation of the brakes of the towed vehicle. In another example, another type of existing brake controller is mounted in the towing vehicle and employs a microprocessor and an accelerometer to determine deceleration of the towing vehicle. This brake controller then generates an electrical signal instructing the operation of the brakes of the towed vehicle based on the deceleration.

It is, however, not always desirable to mount a brake controller in a cabin or engine bay of a towing vehicle—especially where the interior trim of the towing vehicle may be damaged. It may be desirable, for example, to provide a more versatile brake controller that can be mounted on exterior to the towing vehicle or the towed vehicle. However, mounting a brake controller in such a way may cause challenges to arise as, for example, the accelerometer may need to be mounted in a particular position and orientation relative to the towing vehicle, the accelerometer and other components of the brake controller need a readily accessible power supply, and the connector and housing will need to be suitably protected from weather and gravel. Allowing control by the driver is another challenge.

A reference herein to a patent document or other matter which is given as prior art is not to be taken as an admission that that document or matter was known or that the information it contains was part of the common general knowledge as at the priority date of any of the disclosure or claims herein. Such discussion of prior art in this specification is included to explain the context of the present invention in terms of the inventor's knowledge and experience.

SUMMARY OF INVENTION

According to one aspect of the present invention, there is provided a brake controller for a towed vehicle braking system, wherein the towed vehicle has combined brake and turn lights activated by combined light signals from a towing vehicle, said brake controller configured to generate a braking control signal to the towed vehicle braking system, the brake controller including: an inertial sensor including plural sensor axes for generating sensor data associated with each sensor axis; a processor for processing said sensor data to estimate a deceleration of the towing vehicle; and a housing including an input connector for electrical connection to a towing vehicle and an output connector for electrical connection to a towed vehicle, wherein the housing is adapted to be mounted to the towing vehicle, wherein the inertial sensor and the processor are housed within the housing, and the brake controller is electrically connected to the towing vehicle via the input connector and to the towed vehicle via the output connector, and wherein the output connector includes an output socket adapted to receive a plug from the towed vehicle, whereby the brake controller is configured to generate and output the braking control signal to control activation of brakes of the towed vehicle braking system based on the deceleration of the towing vehicle estimated by the processor and a brake light signal determined by the processor from received combined light signals from the towing vehicle via the input connector.

For light towed vehicles, standards govern the possible wiring connections between a towing vehicle and a towed vehicle. These standards include a 7-pin trailer connection according to the ISO1185 and SAE J560 standards, and a 7-pin trailer connection according to the J2863 standards. In an example, the housing of the brake controller is integrated into a SAE J2863 7-pin towed vehicle connection socket mounted to the towing vehicle. Also, preferably, the brake controller is compatible with chemical encapsulation processes, thereby avoiding the need to provide a sealed housing.

In an embodiment, the output socket is adapted to receive an output adapter that is adapted to receive a further plug from the towed vehicle. In addition, or in the alternative, the input socket is further adapted to receive an input adapter that is adapted to be received by a further socket on the towed vehicle. That is, any of the connectors are adapted to receive an adapter, which may also be connected to a loom, so as to convert between different plug and socket types.

In an embodiment, the output socket includes a first output socket adapted to receive a first plug from the towed vehicle and a second output socket adapted to receive a second plug from the towed vehicle. For example, the first output socket is for communicating lighting signals to a lightweight towed vehicle and the second output socket is for communicating all 7 control signals to the towed vehicle including the braking control signal.

In an embodiment, the input connector includes an input plug adapted to be received by a towed vehicle connection socket on the towing vehicle, thereby mounting the housing to the towing vehicle. The housing and the output socket then form a towed vehicle connection socket on the towing vehicle. That is, the input plug of the brake controller is inserted into the towed vehicle connection socket by an installer, and the housing and the output socket form a new towed vehicle connection socket on the towing vehicle to receive a plug from the towed vehicle. Integration of the brake controller into the towed vehicle connection socket, i.e. the trailer connection socket, reduces the overall cost of manufacture and installation as only one controller and one connector is required to be installed for a towed vehicle. Also, by inserting the input plug of the input connector into the towing vehicle connection socket, the towing vehicle provides a captive fixing mechanism to increase the likelihood that the installer installs the brake controller correctly.

In an embodiment, the housing or chemical encapsulation may include mounting features, such as grooves, notches or eyelets that increase the likelihood that the installer installs the brake controller correctly.

In an embodiment, the brake controller further includes pins or busbars disposed between the input connector and the output connector, and the processor and the inertial sensor are implemented in a module having a Printed Circuit Board (PCB). These pins or busbars also connect to the PCB. Also, the module and the pins or busbars that connect to the PCB are housed within the housing. Furthermore, the pins or busbars connect to the PCB into holes in the PCB that are sized to provide an interference fit with the pins or busbars, thereby providing electrical connection and mechanical support to the PCB.

In an embodiment, the brake controller further includes power electronics, in communication with the processor, configured to output the braking control signal to control activation of the brakes of the towed vehicle braking system.

In an embodiment, the brake controller further includes a brake light circuit having an isolation transistor configured to be turned OFF when the braking control signal is outputted by the power electronics to prevent the towing vehicle from detecting that brake lights of the towed vehicle are turned ON. For example, on some new vehicles, a brake controller connected to the towing vehicle wiring while the towed vehicle is not connected must not pull the lighting circuits of the brake controller down below a certain level to avoid tripping towing vehicle faults.

In an embodiment, the brake controller determines the brake light signal from the combined light signals from the towing vehicle when a threshold voltage is detected as being exceeded from the combined light signals.

In an embodiment, the brake controller further includes a safety controller configured to generate and output the braking control signal to control activation of the brakes of the towed vehicle braking system if the processor fails, thereby providing redundancy for the processor.

In an embodiment, the processor implements a lighting control module configured to generate and output a towed vehicle brake light signal to control activation of lights of the towed vehicle when the light signals are determined by the processor. The lighting control module in the brake controller allows for simplified wiring, with a single fuse and power feed for towed vehicle lights, towed vehicle auxiliary power, and the brake controller, thereby reducing installation cost.

In such an embodiment, the processor may determine active light signals via reading analogue signals, or via a digital interface such as CAN.

In an embodiment, the brake controller receives power via the input connector for some or all components of the brake controller and for auxiliary devices of the towed vehicle, and the input connector includes a fuse. In this embodiment, the processor may monitor current drawn by each of the auxiliary devices of the towed vehicle, and the brake controller may provide additional current to a selected one of the auxiliary devices if remaining ones of the auxiliary devices are drawing current below their rated current and total current drawn by the auxiliary devices is below the fuse rating. Further, the processor may be configured to detect water (especially salt water) immersion of the output connector. Here, the brake controller disables current to the auxiliary devices if water is detected and it is safe to disable devices. The intelligent control and regulation of power prevents fuse or wiring damage in the supply wiring, the fuse may be implemented by a digital twin in the processor.

Moreover, for applications where the connectors of the brake controller may be submerged when not in use, the processor may further be able to disconnect power from the pins of the output connector during submersion to reduce corrosion of the connector. Thus, further increasing connector lifetime and reliability.

In an embodiment, the processor implements a wireless module configured to provide data communication between the processor and an external computing device. Alternatively, or in addition, for certain connector types, the brake controller may provide the connection of a wired remote control via a dedicated one of the pins of, for example, a 7-pin connector. In the embodiments, the brake controller, especially when implementing a lighting control module, can communicate information to the external computing device to allow for greater user control of the towed vehicle. For example, a user may communicate with the brake controller via a dedicated application on the external computing device to test towed vehicle lights or to monitor their lighting status. Incorporation of lighting, brake control and connectors together into a brake controller allows for the minimising of costs for wireless control and monitoring of the towed vehicle.

In an embodiment, the brake controller further includes one or more LEDs and the processor is further configured to illuminate the one or more LEDs to communicate information to a user of the brake controller. For example, the LEDs are illuminated when a user pairs an external computing device with the brake controller.

In an embodiment, the brake controller is further configured to estimate one or more characteristics of circuits associated with activation of lights of the towed vehicle and or brakes of the towed vehicle, and wherein the one or more characteristics contribute to a fingerprint corresponding to the towed vehicle that is used to automatically identify the towed vehicle. With reference to an example, the combination of towed vehicle lighting and braking control allows for a relatively unique fingerprint to be associated with a towed vehicle based on, for instance, lighting circuit impedances. This can allow for advantages such as automated storage and retrieval of settings for different towed vehicles.

The processor may also communicate these fingerprints and associated configuration data of the towed vehicle braking system to the external computing device via the wireless module. This associated configuration data includes data for configuring control of brakes of the towed vehicle. Furthermore, the incorporation of a lighting control module allows for voltage and current characteristics of multiple towed vehicle lighting circuits to be analysed, providing a method to identify different towed vehicles, and hence configuration settings can be reused for a given towed vehicle.

According to another aspect of the present invention, there is provided a brake controller for a towed vehicle braking system, wherein the towed vehicle has combined brake and turn lights activated by combined light signals from a towing vehicle, said brake controller configured to generate a braking control signal to the towed vehicle braking system, the brake controller including: a module having an inertial sensor including plural sensor axes for generating sensor data associated with each sensor axis and a processor for processing said sensor data to estimate a deceleration of the towing vehicle; and a loom including at least one input connector for electrical connection to a towing vehicle at one end of the loom and an output connector for electrical connection to a towed vehicle at an opposed end of the loom, wherein the brake controller is electrically connected to the towing vehicle via the input connector and to the towed vehicle via the output connector, and wherein the output connector includes an output socket adapted to receive a plug from an adapter which then receives a plug from the towed vehicle, whereby the brake controller is configured to generate and output the braking control signal to control activation of brakes of the towed vehicle braking system based on the deceleration of the towing vehicle estimated by the processor and a brake light signal determined by the processor from received combined light signals from the towing vehicle via the input connector.

In this configuration, the connectors may be to an internal vehicle standard such as USCAR 999-S-007.

In an embodiment, the processor and the inertial sensor are implemented on a Printed Circuit Board (PCB) of the module, and wherein wire ends of the loom connect electrically to the PCB and are encapsulated separately to the enclosure containing the PCB. Further, the module and at least part of the wires of the loom that terminate at the PCB are over-moulded or potted, thereby providing insulation and mechanical support to the module.

In an embodiment, the loom further includes an equaliser adapted to reduce effects of sway and vibration on the loom.

BRIEF DESCRIPTION OF DRAWINGS

Embodiments of the present invention will now be described with reference to the accompanying drawings, wherein.

DETAILED DESCRIPTION

Figure 1:
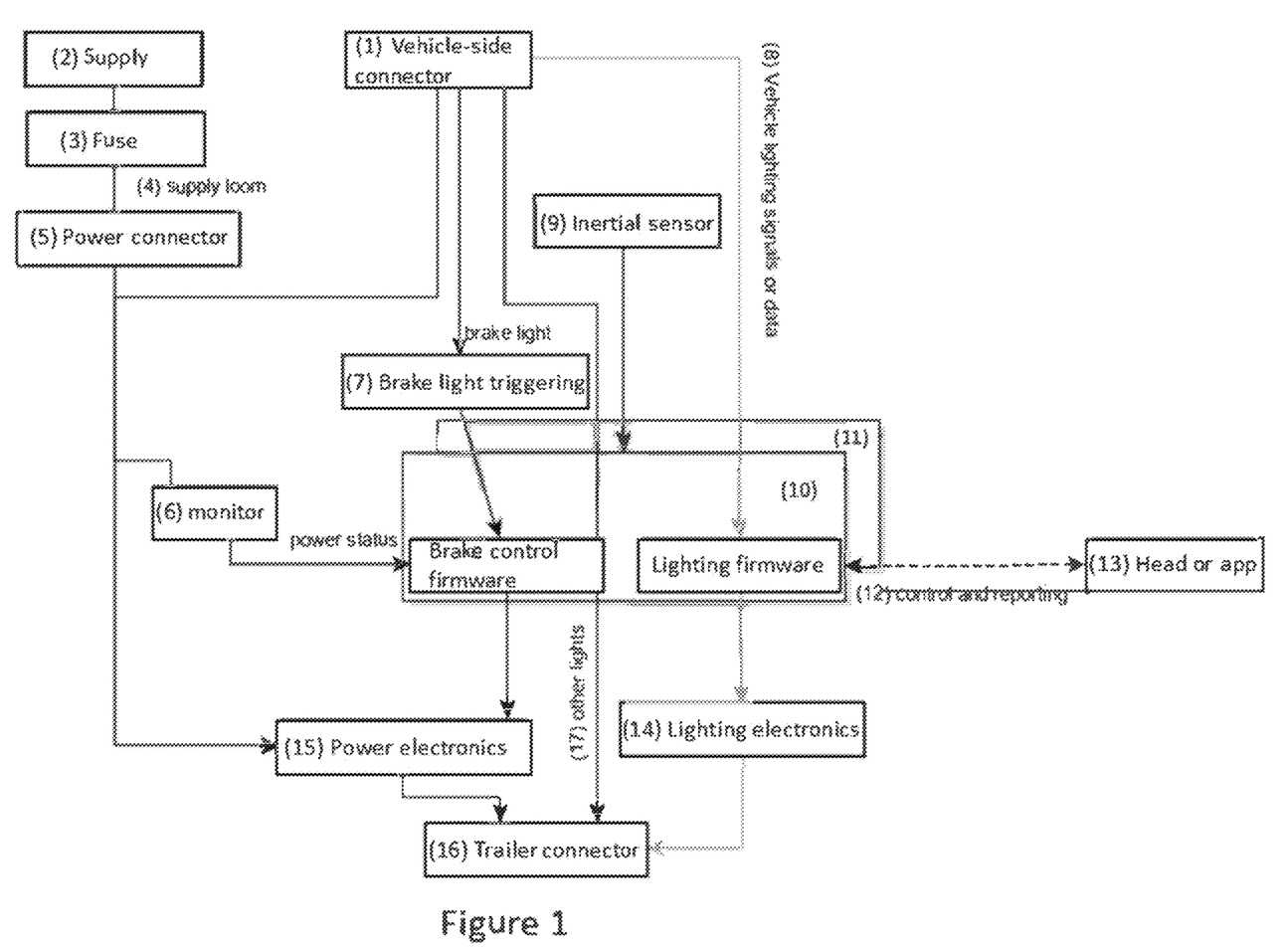
FIG. 1 is a block diagram showing an embodiment of a brake controller for a towed vehicle braking system in operation.

FIG. 1 shows a block diagram of a brake controller for a towed vehicle braking system in operation, according to an embodiment of the present invention. FIG. 1 also shows the electrical and electronic construction of the brake controller. The construction of this brake controller includes sensors, power electronics, connectors for inputs and outputs, and light triggering circuits.

More specifically, the brake controller is implemented by a microcontroller 10, which receives sensor data from an inertial sensor 9 and a brake light signal, determined by a brake light triggering circuit 7 from received combined light signals from the towing vehicle via a vehicle side input connector 1. As mentioned, the towed vehicle has combined brake and turn lights activated by combined light signals from the towing vehicle. For example, the brake controller receives combined brake and turn light signals from the towing vehicle for each of the left and right sides.

The microcontroller 10 is also configured to receive power and power status from a monitor circuit 6. The power may be received either from the vehicle side input connector 1 or from another power connector 5 on the towing vehicle. The power connector 5 on the towing vehicle is connected to a power supply 2, e.g. a 12V battery, via a fuse 3.

Brake control firmware implemented by the microcontroller 10 is configured to generate and output a braking control signal to power electronics 15, and then to the towed vehicle braking system via a trailer connector 16. It will be appreciated by those persons skilled in the art that the towed vehicle includes a trailer. The microcontroller 10 is also in data communication (e.g. via wireless communication) with a remote head 13 mounted in the towing vehicle. The remote head 13 is configured to communicate control information to the microcontroller 10, such as gain to be applied to the braking control signal for the towed vehicle braking system.

In an embodiment, the microcontroller 10 also implements lighting control firmware. The lighting firmware is configured to receive towing vehicle lighting signals 8, and to generate and output a lighting control signal to lighting electronics 14 and then to the towed vehicle lighting system via the trailer connector 16. In addition, or in the alternative, the lighting signals from the towing vehicle are sent to the lighting electronics and to the towed vehicle directly via the vehicle side connector 1 and trailer connector 16.

Further, the brake controller further includes a safety controller 11, configured to operate independently of the microcontroller 10. The safety controller 11 is configured to be able to override outputs of the microcontroller 10 to ensure safe operation of the brake controller if the microcontroller 10 fails.

Figure 2:
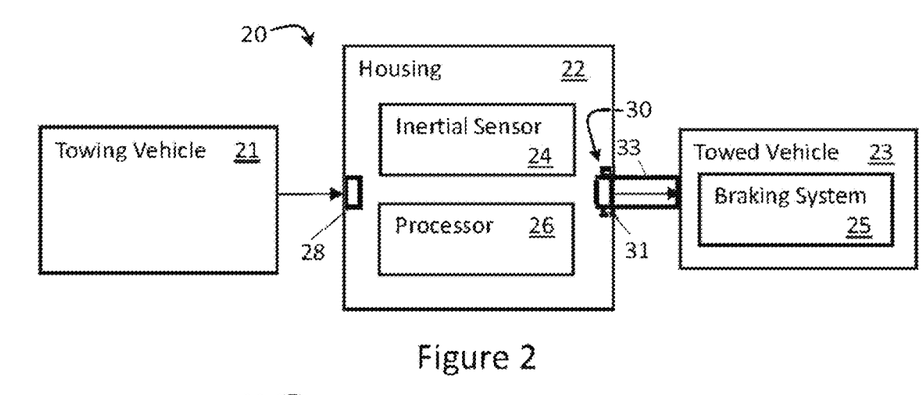
FIG. 2 is a block diagram showing an embodiment of a brake controller for a towed vehicle braking system.
Figure 3:
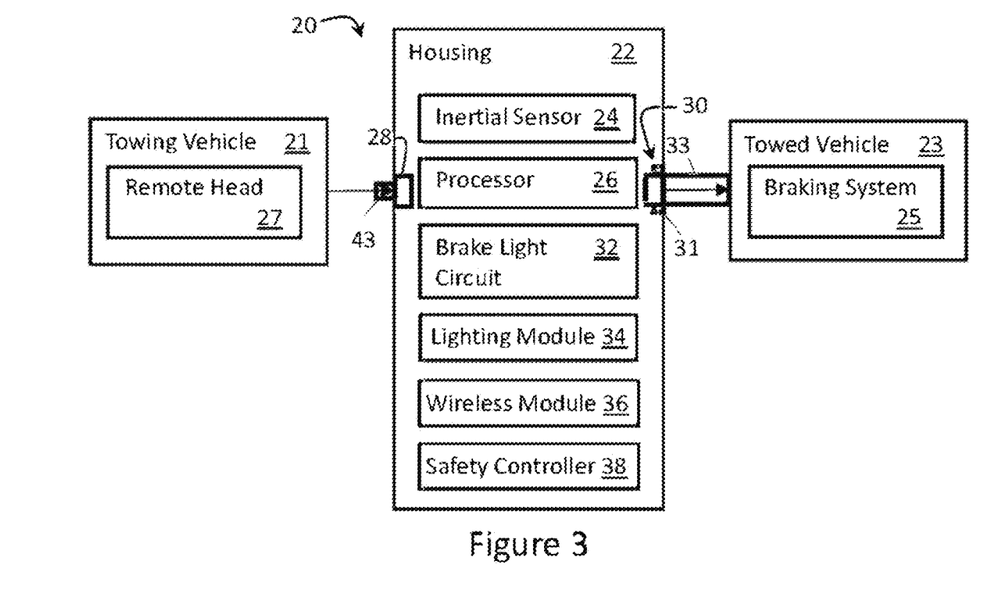
FIG. 3 is a block diagram showing another embodiment of a brake controller for a towed vehicle braking system.

FIGS. 2 and 3 show further block diagrams of a brake controller 20 for a towed vehicle braking system according to further embodiments of the present invention. The brake controller 20 shown in these Figures is electrically connected to a towing vehicle 21 and to a towed vehicle 23 to control the braking system 25 of the towed vehicle 23. To do so, the brake controller 20 is configured to generate and output a braking control signal for the towed vehicle braking system 25. In the embodiments, the towing vehicle 21 and the towed vehicle 23 also have combined brake and turn lights activated by combined light signals.

The brake controller 20 includes a housing 22, and the electronic components of the brake controller 20 are housed with the housing 22. These are configured to generate a braking control signal for the towed vehicle braking system 25. The electronic components include an inertial sensor 24, including plural sensor axes for generating sensor data associated with each sensor axis, and a processor 26 for processing the sensor data to estimate a deceleration of the towing vehicle.

It will be appreciated by those persons skilled in the art that the processor 26 implements program code to operate the brake controller 20. The program code could be supplied in a number of ways, such as on a memory in data communication with the processor 26. The processor 26 may also be incorporated into a microcontroller, as per FIG. 1, that is configured to execute one or more algorithms in the program code, stored in an associated memory, such as RAM and/or ROM (not shown), to generate the braking control signal to control activation of brakes of the towed vehicle braking system 25.

The housing 22 further includes an input connector 28 for electrical connection to the towing vehicle 21 and an output connector 30 for electrical connection to the towed vehicle 23. Thus, the brake controller 20 is electrically connected to the towing vehicle 21 via the input connector 28 and to the towed vehicle 23 via the output connector 30. Further, the output connector 30 includes an output socket 31 adapted to receive a plug 33 from the towed vehicle 21.

The brake controller 20 is also configured to receive power from the towing vehicle 21 for its operation. In operation, the brake controller 20 is configured to generate and output the braking control signal to control activation of brakes of the towed vehicle braking system 25 based on the deceleration of the towing vehicle 21 estimated by the processor 26 and based on a brake light signal of the towing vehicle 21 determined by the processor 26 from received combined light signals from the towing vehicle 21 via the input connector 28.

The braking control signal can communicate further information to the braking system 25 of the towed vehicle 23, including an output level that is used to control a braking force to be applied to the brakes of the towed vehicle braking system 25. A user can control the output level by controlling the gain for the braking control signal with a remote head 27 associated with the brake controller 20, as shown in FIG. 3. The remote head 27 is mounted in the towing vehicle 21, remote from the brake controller 20, and is configured to control the gain for the braking control signal. The remote head 27 may be potentiometer configured to provide gain control or a rotary encoder. Also, the remote head 27 may include other input and output devices so that a user can interface with the brake controller 20, such as a touch screen display or LEDs to display status of the braking system 25.

The remote head 27 may be configured to wirelessly communicate with the brake controller 20 to control the brake controller 20. Remote control, however, may instead be achieved by an application implemented by a computer or smart phone. The remote control may allow a per-vehicle setting for current that may safely be drawn from lighting circuits. Also, the remote control (or application) allows for reporting of warnings when power requirements of the brake controller 20 exceed (or are likely to exceed) the rated power of the supply. To communicate wirelessly, the brake controller 20 further includes a wireless module 36 also housed within the housing 22.

The inertial sensor 24 may also take the form of an accelerometer configured to determine deceleration of the towing vehicle 21. Such an accelerometer is a multi-axis accelerometer for sensing the deceleration of the towing vehicle 21 in multiple directional axes in order to ensure that acceleration can be transformed so that braking deceleration may be separated from other signals. The processor 26 is configured in this embodiment to generate the braking control signal to control activation of the brakes of the towed vehicle braking system 25 based on the determined deceleration of the towing vehicle 21 and the determined brake light signal from the combined brake light signals from the towing vehicle 21. The electrical control signals will then be amplified by power electronics of the braking system 25 to control the mechanical components of the braking system 25 via suitable electromagnetic, hydraulic or pneumatic actuators. The power electronics may include high-side drivers and commutating diodes in order to drive the electromagnetic actuators, which are commonly highly inductive and require high current.

Figure 4:
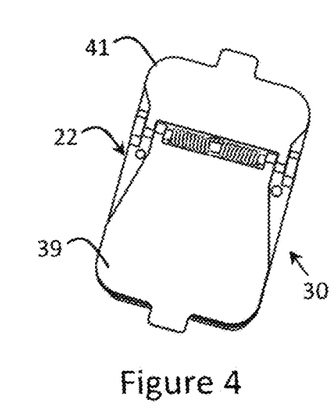
FIG. 4 is a front view of a brake controller for a towed vehicle braking system in accordance with an embodiment.
Figure 5:
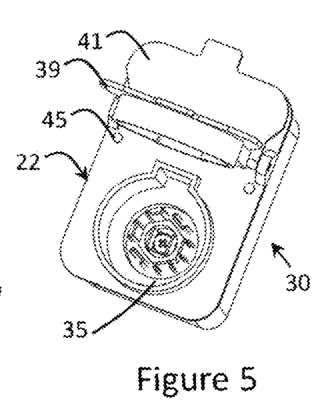
FIG. 5 is a front view of the brake controller of FIG. 4 with a first cover for covering a first output socket in the open position.
Figure 6:
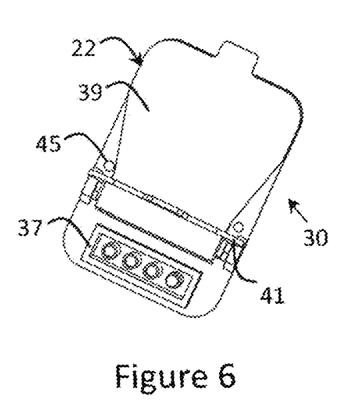
FIG. 6 is a front view of the brake controller of FIG. 4 with a second cover for covering a second output socket in the open position.
Figure 7:
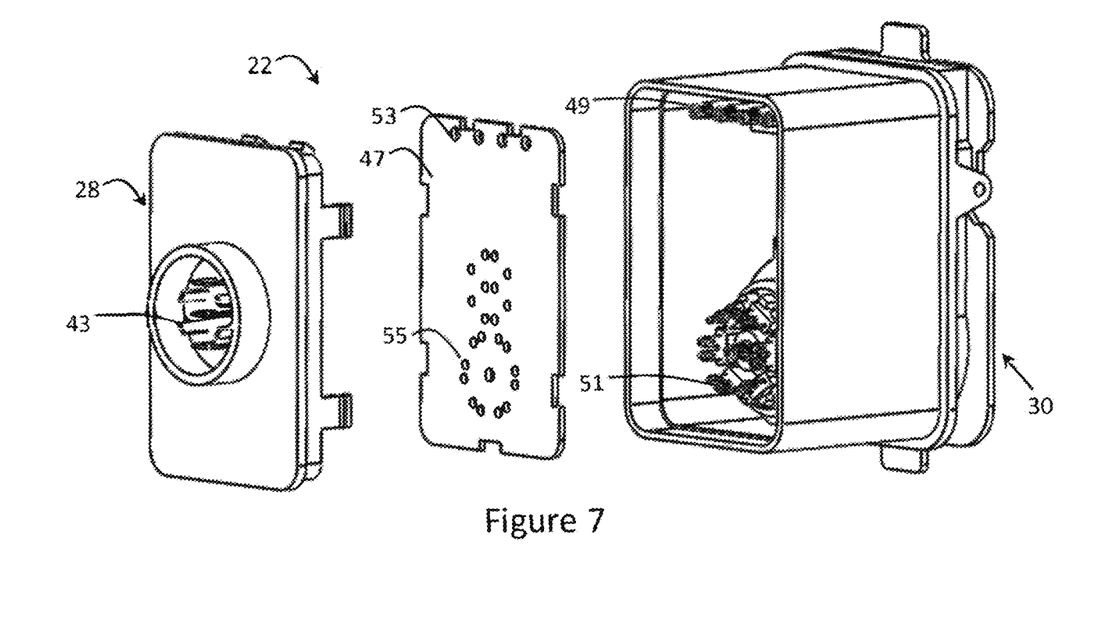
FIG. 7 is an assembly view of a brake controller in accordance with an embodiment.

The input connector 28, output connector 30, and housing 22 of the brake controller 20 may take a number of forms to suit different connector types for different towed and towing vehicles. FIGS. 4 to 6 show different views of the housing 22 of the brake controller 20 wherein the output connector 30 includes two output sockets: a 7-pin connector type socket and a 4-pin connector type socket on the towed vehicle side of the housing 22. FIG. 7 shows the towing vehicle side of the housing 22. The towing vehicle side of the housing 22 is adapted to be mounted to the towing vehicle 21 so that the brake controller 20 is mounted to the towing vehicle 21.

That is, FIGS. 4 to 6 show the output connector 30 including a first output socket 35 and a second output socket 37. The first output socket 35 is adapted to receive a first plug (to SAE standard J2863 but not shown) from a towed vehicle that uses electrical brakes and the second output socket 37 is adapted to receive a plug (not shown) from an alternative towed vehicle without electrical brakes. The first output socket 35 is protected via a moveable first flap 39 and the second output socket 37 is protected by a moveable second flap 41. The first flap 39 and the second flap 41 are spring biased so as to cover their respective sockets when they are not in use.

As mentioned above with respect to an example, the first output socket 35 may be adapted to communicate lighting signals to the towed vehicle 23 in addition to the lighting signals, the second output socket 37 may be adapted to communicate control signals to the towed vehicle 23 such as the braking control signal. Either of these output sockets may be also adapted to supply operating power to the towed vehicle braking system 25, and to auxiliary devices installed on the towed vehicle 23 from power received from the towing vehicle 21. As the housing 22 is mounted to the towing vehicle 21, the housing 22 and the output sockets 35 37 in this embodiment form a towed vehicle connection socket on the towing vehicle 21.

In the embodiment shown in FIG. 7, the housing 22 is mounted to the towing vehicle 21 via an input plug 43 of the input connector 28. This is shown in FIG. 7 as a 7-pin connector type plug. The input plug 43 is adapted to be received by a towed vehicle connection socket on the towing vehicle 21, thereby mounting the housing 22 to the towing vehicle 21 and electrically and mechanically connecting the brake controller 20 to the towing vehicle 21. Thus, the housing 22 of the brake controller 20, when mounted to the towing vehicle 21, provides a new towed vehicle connection socket on the towing vehicle 21 for a plug of the towing vehicle to be inserted therein. That is, FIG. 7 shows the brake controller 20 packaged in such a way as to replace an existing trailer connector.

The electronics of the brake controller 20 are provided by one or more modules on a Printed Circuit Board (PCB) 47. The electronics of the brake controller 20 provided include the abovementioned processor 26 and inertial sensor 24, as well as a lighting module 34, wireless module 36 and safety controller 38. As mentioned, the safety controller 38 provides redundancy for the processor 26.

To operate the electronics implemented on modules on the PCB 47, the brake controller 20 includes pins 49 51 disposed between the input connector 28 and the output connector 30 which terminate at the PCB 47. The pins 49 51 terminate at the PCB 47 in respective holes 53 55. That is, the pins 49 51 terminate at the PCB 47 into respective holes 53 55 in the PCB 47 that are sized to provide an interference fit with the pins 53 55, thereby providing electrical connection and mechanical support to the PCB 47.

Figure 8:
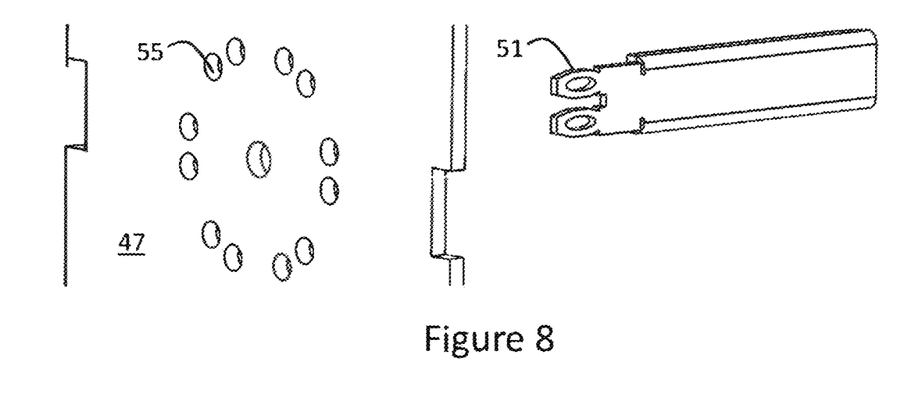
FIG. 8 shows an embodiment of a pin for insertion into holes of a Printed Circuit Board (PCB) of a brake controller of FIG. 7.
Figure 9:
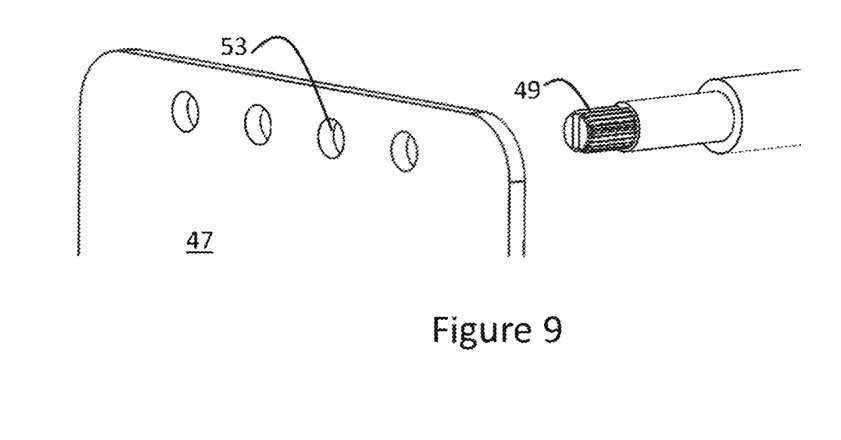
FIG. 9 shows another pin for insertion into holes of the Printed Circuit Board (PCB) of FIG. 7.

FIGS. 8 and 9 show the pins 49 51 terminating at holes 53 55 in the PCB 47 in more detail. In the embodiment shown in these Figures, the output connector 30 includes two output sockets 35 37 for connection to the towed vehicle 23 as per FIGS. 4 to 7. Here, holes 53 are for pins 51, which are for the second output socket 37, and holes 55 are for pins 51, which are for the first output socket 35. In this way, the input connector 28 and output connector 30 are electrically and physically attached to the PCB 37 using pins 49 51, which are moulded into the housing 12 to prevent water or dust ingress.

The housing 22 may further be secured together with clips and sealed with a ring seal to prevent water ingress. Also, the housing may be moulded from a suitable grade of material (e.g. glass-filled Nylon 66) to withstand regular usage, including bombardment with gravel from the wheels of the towing vehicle 21.

Figure 10:
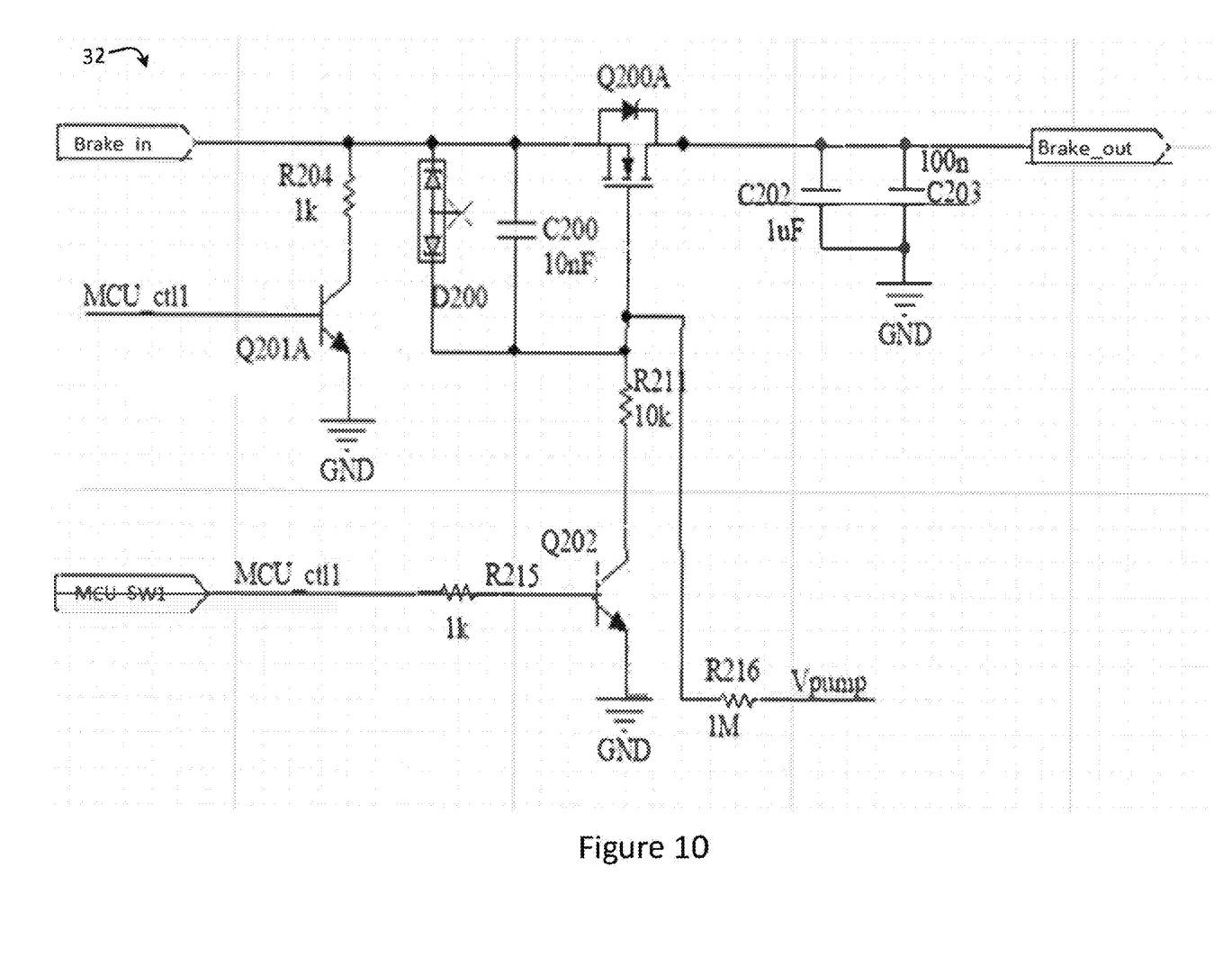
FIG. 10 shows an embodiment of a brake light isolation circuit of a brake controller.
Figure 11:
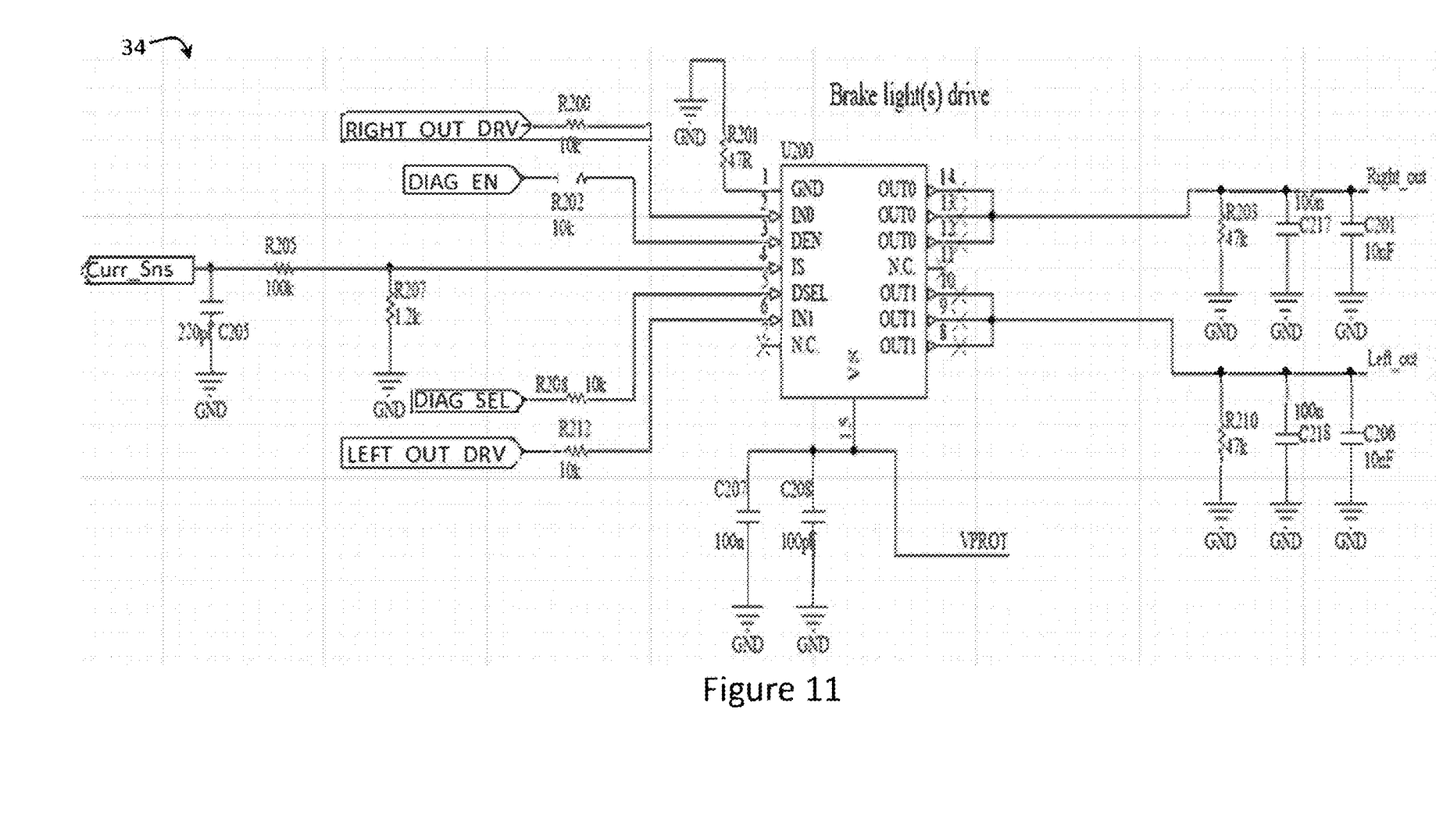
FIG. 11 shows an embodiment of a lighting drive circuit of a brake controller.

As mentioned, embodiments of the brake controller 20 may also include a brake light circuit 32 and a lighting module 34. FIG. 11 shows an embodiment of the brake controller 20 where the lighting control function is implemented by the lighting module 34. In this Figure, the lighting module 34 is shown as a lighting drive circuit. In respect of an embodiment of the brake controller 20 that does not include a lighting control function implemented by the lighting module 34, FIG. 10 shows a brake light circuit 32 that is configured to prevent vehicle faults from being tripped when the brake controller 20 activates the brake lights independently of the towing vehicle 21. When the brake controller 20 is driving the towed vehicle brake light, Q200A can be turned off to prevent the towing vehicle 21 from sensing the voltage produced by the brake controller 20. At the same time, Q201A should be turned on to prevent the towing vehicle 21 sensing disconnection of the towed vehicle 23 and enabling reversing sensors.

The brake light circuit 32 further include low-current impedance detection circuits. Many modern vehicles have trailer lighting modules that have very low thresholds for detection of lighting circuits. Any circuit that pulls the output voltage on a high-impedance lighting circuit more than around 6V below the supply voltage will cause such a tow vehicle to detect a trailer. This is undesirable because it will mean that park assistance sensors will be disabled while the circuit is attached, and it will also prevent the tow vehicle from detecting faults in lighting circuits. In other embodiments, it is undesirable to have a high impedance input that may be triggered by saltwater ingress in looms.

In operation, the brake controller 20 generates the braking control signal to the towed vehicle braking system when a threshold voltage indicative of the brake light signal being turned ON is detected as being exceeded. In one embodiment, the brake controller 20 loads the brake light signal with a test load greater than 0.1 mA, and substantially disables the test load when voltage of the brake light signal is detected as falling below the threshold voltage, in order to prevent the towing vehicle 21 from falsely detecting connection of a towed vehicle (a phantom of towed vehicle 23).

Figure 12:
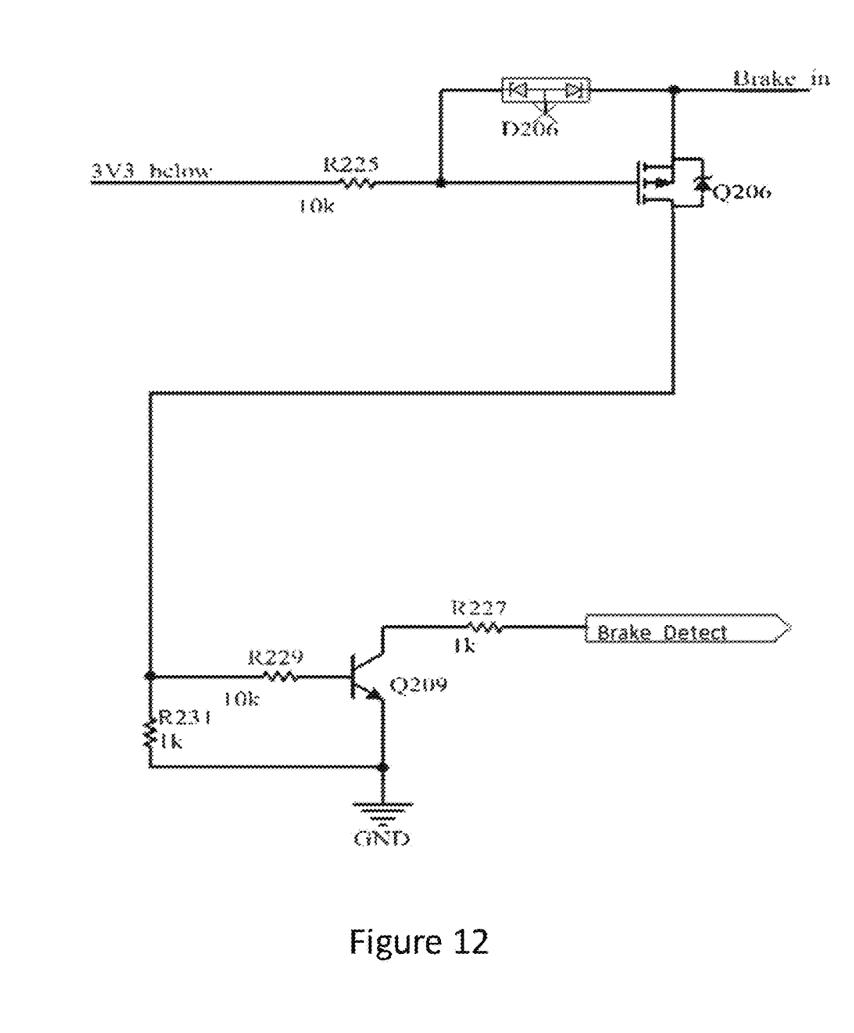
FIG. 12 shows an embodiment of a brake light detection circuit of a brake controller.
Figure 13:
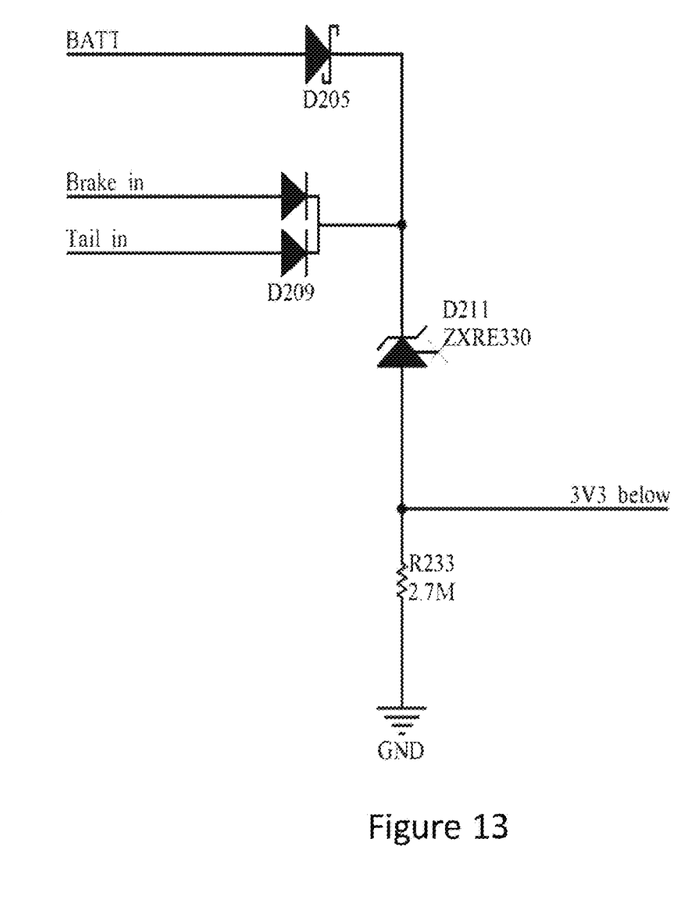
FIG. 13 shows an embodiment of a brake light detection bias circuit of a brake controller.

FIG. 12 and FIG. 13 show circuits that may be used to prevent such faults. In these circuits, the voltage reference D211 gives a voltage approximately 4V below the supply voltage. This is then used as the gate voltage for the P-channel MOSFET Q206. This means that the light detection circuits (R231, R229, Q209) cannot pull the voltage at Brake_in more than approximately 3V below the supply voltage. If the pull-up on the brake light circuits has a high impedance (e.g. a fault detection circuit), then Q206 will turn off, and no signal will be detected. However, if a low impedance pull-up is used (e.g. lights are switched on), then Q206 will be able to conduct detectable current to R231, causing the light signal input to be detected. Note that Q206 may be replaced by a JFET. R231, R229, and Q209 may be replaced with other current to logic level conversion circuits. Further, two of each of these circuits would be required—one left hand and one right hand side circuit.

Embodiments of the brake controller 20 that include trailer lighting functions may also monitor the towing vehicle lights via the low-current impedance detection circuits described above and will drive the towed trailer lights via protected high-side switches. In an alternative implementation, the brake controller 20 may receive lighting information by a serial bus (e.g. CAN). In such a case, the input connector 28 may be simplified to a 4-pin connector (power, ground, CAN+, CAN−). The auxiliary power distribution switch will also be a similar circuit, but with a higher current rating for the high side switch.

In an embodiment, the processor 26 is further configured to monitor simultaneous current on all switches on the towed vehicle 23. These switches include those for auxiliary devices on towed vehicle 23 as well as for control of lighting and brakes on the towed vehicle 23. The processor 26 is thus configured to allow some additional current on the auxiliary power output if other outputs are below their rated current and total current is below the fuse rating. This is desirable to allow high start-up current for some auxiliary devices like pumps. This can be controlled by the processor 26 implementing an algorithm including a digital twin of the supply fuse.

The algorithm is as follows. A variable H is created to model the heat energy stored in the fuse element. For each measurement cycle, update $H_{t+dt} = H_t + I^2 dt - \alpha H_t dt$, where:

I is the total current on all output circuits dt is the time since the last measurement α is a constant determined experimentally from measurements of fuses.

If H is above a threshold, then a load-shedding strategy is to be applied. If it is known that the towed vehicle 23 is not using hydraulic brakes, then the load shedding will be in the following order: auxiliary power, then tail/marker lights, then reverse lights, then brake lights, leaving brakes as the highest priority. If the towed vehicle 23 may be using hydraulic brakes, then the strategy will be: tail/marker lights, then reverse lights, then brake lights, then auxiliary power, leaving brake control output as the highest priority.

Note that a higher-order (non-linear) function may be used to model power dissipation: i.e. $H_{t+dt} = H_t + I^2 dt - f(H_t) dt$ In addition, the processor 26 may be configured to detect water immersion, especially salt-water immersion, of the output connector 30 and disable current to the auxiliary devices if detected. To do so, the brake controller 10 has switchable weak pullups on each output. When there is no trailer connected, only the weak pullups will be active, allowing the processor to monitor impedance. Intermittent use of weak pullups provides protection against corrosion if the connector is immersed in salt-water. Once a full load is detected on at least one circuit, power will be enabled to the output connector 30 by the processor 26. In an alternative embodiment, one or more of the weak pullups will be implemented with an H-bridge circuit or a capacitive drive to ensure that the DC current through the connector pin will be zero while the trailer is connected.

Integration of further electronics in the brake controller 10 allow for some extra features to be implemented such as wired control. In one embodiment, wired (LIN) remote control is provided when the input connector 28 is a vehicle connector (e.g. a 7-pin connector) with one or more spare pins. In this embodiment, a spare pin is used by the brake controller 20 to communicate with a wired remote control via a protocol such as LIN.

As mentioned, in another embodiment, the brake controller 20 implements wireless remote control via the wireless module 36. The wireless module 36, or the wired control, enables data communication between the processor 26 and an external computing device. The external computing device can run an application thereon to communicate data with the processor 26, including transmitting a per-vehicle setting for current that may safely be drawn from lighting circuits on the towed vehicle 23.

The external computing device can also receive reports of warnings when power requirements of the brake controller 20 exceed (or are likely to exceed) the rated power of the supply. Further, autonomous lighting of trailer lights may be provided by the external computing device or the wired remote control. This is particularly valuable for testing that a trailer is electrically connected when hitching the trailer.

As mentioned, the processor 26 is further configured to illuminate LEDs 45, as shown in FIGS. 4 to 6, to communicate information to a user of the brake controller 20. This information may be pairing status information to assist the user to pair the external computing device with the brake controller 20 and to show trailer connection status.

In another embodiment, the brake controller 20 is configured to estimate one or more characteristics of circuits associated with activation of brake lights of the towed vehicle 23 and or the brakes 25 of the towed vehicle 23. These characteristics include a fingerprint corresponding to the towed vehicle 23 that may be used to automatically identify the towed vehicle 23. The processor 26 then communicates the fingerprint and associated configuration data, which is associated with configuring control of the brakes of the towed vehicle 23, to the external computing device via the wireless module 36.

Trailer brakes often require electrical compensation to linearize their braking force for each trailer. These factors can be stored and reloaded for when a trailer is attached, instead of requiring the driver to recalibrate the data each time. In the embodiment, the brake controller 20 creates a fingerprint for each connected towed vehicle or tailer, allowing it to automatically load the configuration data associated with each trailer.

This fingerprint will include data for the following elements:

Cold resistance of each lamp circuit at a specified pull-up resistance;
Hot resistance of each lamp circuit;
Cold resistance of trailer brake circuit;
Inductance of trailer brake circuit;
Capacitive decay time of each lamp circuit; and
Capacitive decay time of auxiliary output circuit.

These elements of the fingerprint will be normalised (each element of data will be scaled by the sum of its estimated measurement variance and its estimated population variance), and then all elements will be combined in a vector. The Euclidian metric will then be used to find the nearest neighbour among vectors recorded for previous trailers. The nearest neighbour will then be used to initialise the trailer parameters. If the trailer parameters are then modified, the new settings will be stored with the fingerprint.

Figure 14:
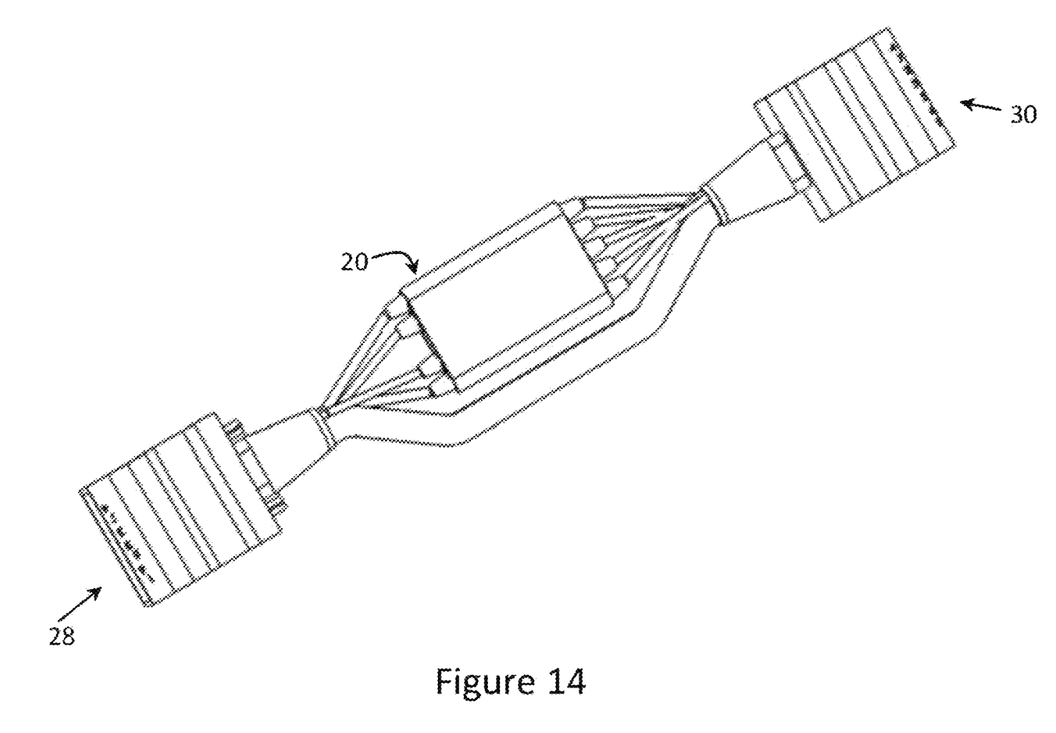
FIG. 14 is a perspective view of an embodiment of a brake controller incorporated with a loom.
Figure 15:
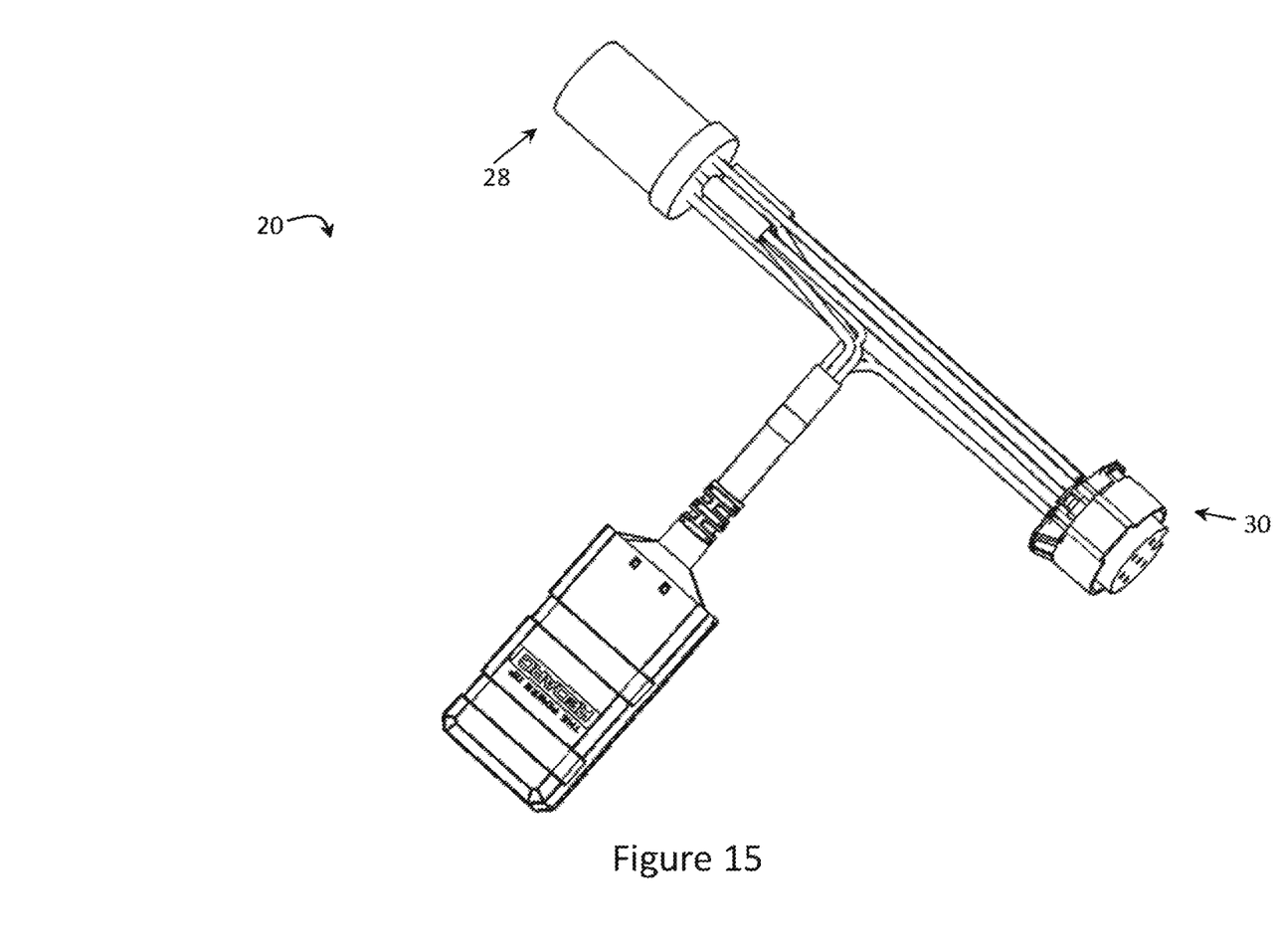
FIG. 15 is a perspective view of an embodiment of a brake controller incorporated with a loom.

In further embodiments shown in FIGS. 14 to 20, the brake controller 20 is formed within one or more looms. For example, the brake controller 20 includes a module having the inertial sensor 14 and the processor 16, and a loom including the input connector 28 at one end and the output connector 30 at the opposed end of the loom. The loom, in this manner, provides the electrical connection for the brake controller 20 to the towing vehicle 21 and the towed vehicle 23. The module is disposed between the input connector 28 and the output connector 30 and is integrated with the loom. Within this module, wires of the loom terminate at a circuit implemented on a Printed Circuit Board (PCB) of the module. This module could be over-moulded or potted, with wires of the loom going through the encapsulant and terminating at the PCB, thereby providing mechanical support and insulation to the module. In FIG. 14, the two connectors shown are 7-pin connectors, but any of the other combinations of connectors may be used to terminate the loom, or the loom may be left unterminated for the installer to connect.

In a preferred embodiment, the brake controller of FIG. 14 will have an output connector 30, which will be able to connect to a vehicle trailer connector adapter, such as a USCAR 999-S-007 to SAE J2863.

Figures 16, 17, 18:
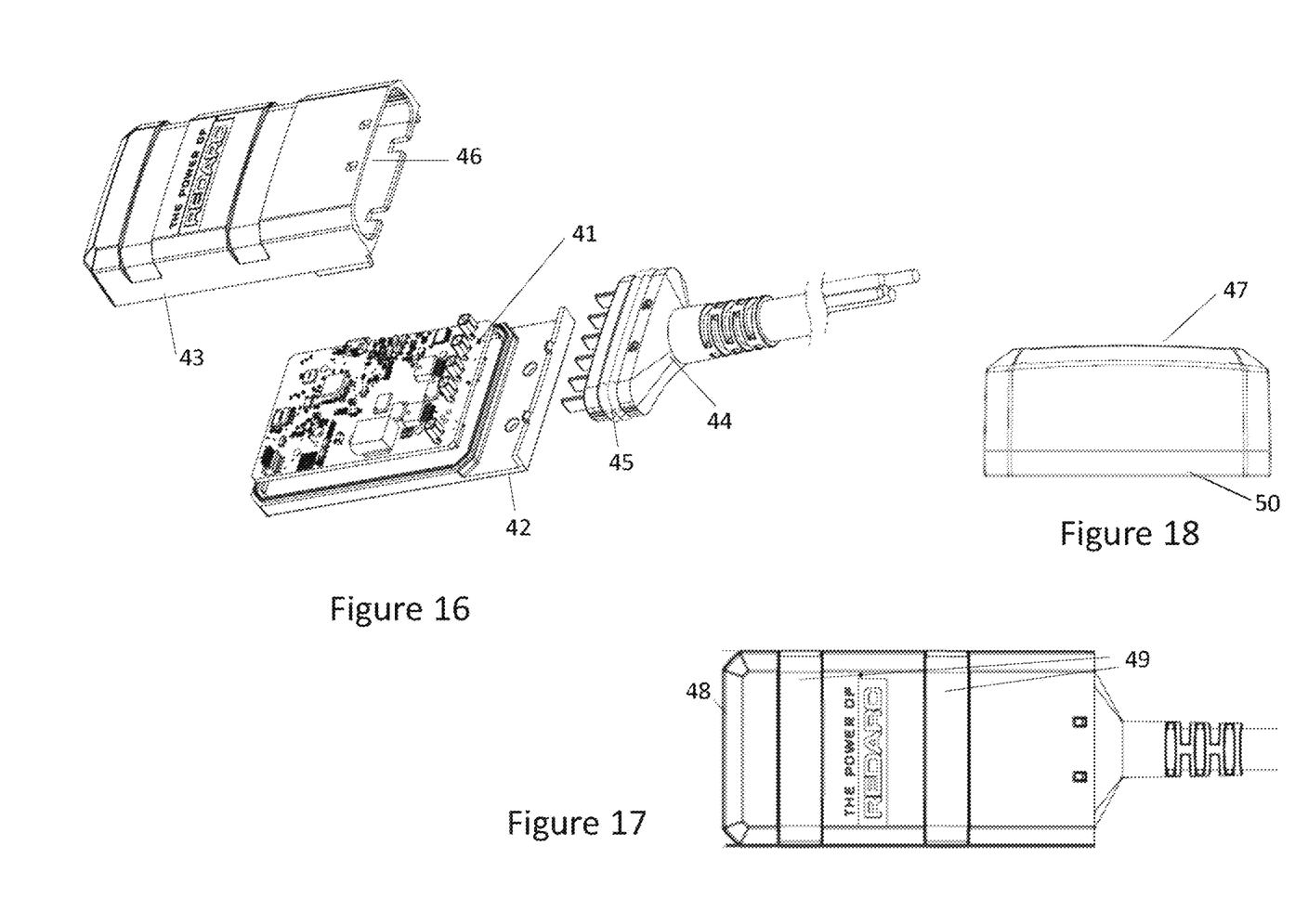
FIG. 16 is an exploded view of an embodiment of a brake controller for installation with a towbar.
FIG. 17 is a top view of an embodiment of a brake controller for installation with a towbar.
FIG. 18 is a rear view of an embodiment of a brake controller for installation with a towbar.

In FIGS. 14 to 20, the brake controller 20 is separate from the connectors, and is designed to fit to other parts of the towbar system. In FIGS. 16 to 18, it is shown that a first 42 and a second housing 46 may be sealed together around electronics 41 using ultrasonic welding, and then connected to a loom via a moulded connector 44, sealed with O-rings 45 to a recess in one half of the housing 46 where the recess is provided to prevent leakage at parting or weld lines. These features enable survival of stresses seen at the towbar, such as thermal shock, stones and water immersion. The housing has a sizing 48 to fit on common, square hollow sections that are used in towbars, and grooves 49 to enable fixing with cable ties. The electronics may use a radio connection for control, and therefore the housing has a desired orientation relative to the towbar members. A curvature of the outer surface 47 and a flat surface 50 may be provided to encourage installation of that face against the metal surface of the towbar elements, thereby ensuring that the antenna is pointing outwards.

Figure 19:
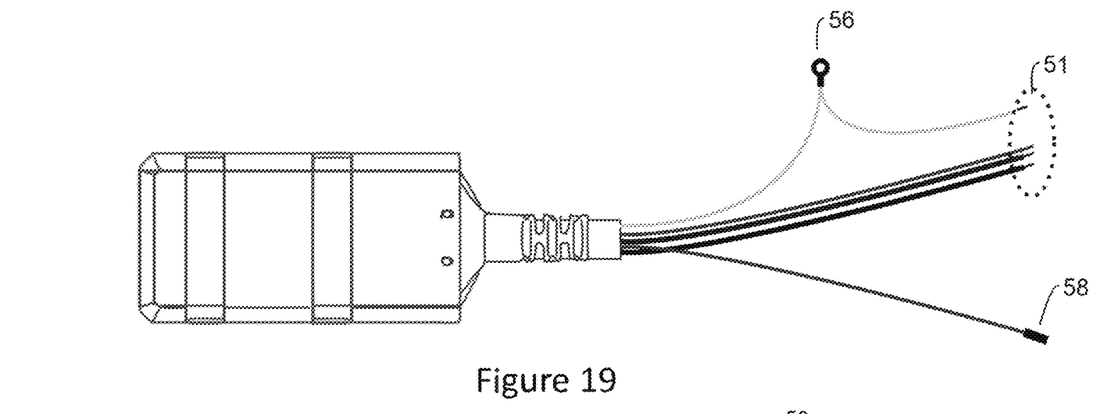
FIG. 19 shows loom details of an embodiment of a brake controller for installation with a towbar having a powered connector.

In FIG. 19, this embodiment may have a portion of the loom with equal-length wires, from the connector 44 to ends terminated with ferrules 51 for easy installation to a trailer connector. The wires in this loom may be stop lamp, earth, power and brake output wires. It may further include a branch earthing element 56, such as a ring terminal sized for the bolts used in a towbar (e.g. M10). The wires to the trailer connector may be made with a thin insulation (e.g. TXL) for ease of installation. To support the brake light isolation feature, a separate wire may be provided, pre-terminated to a butt splice 58 with glue-lined heat-shrink for the installer's convenience.

Figure 20:
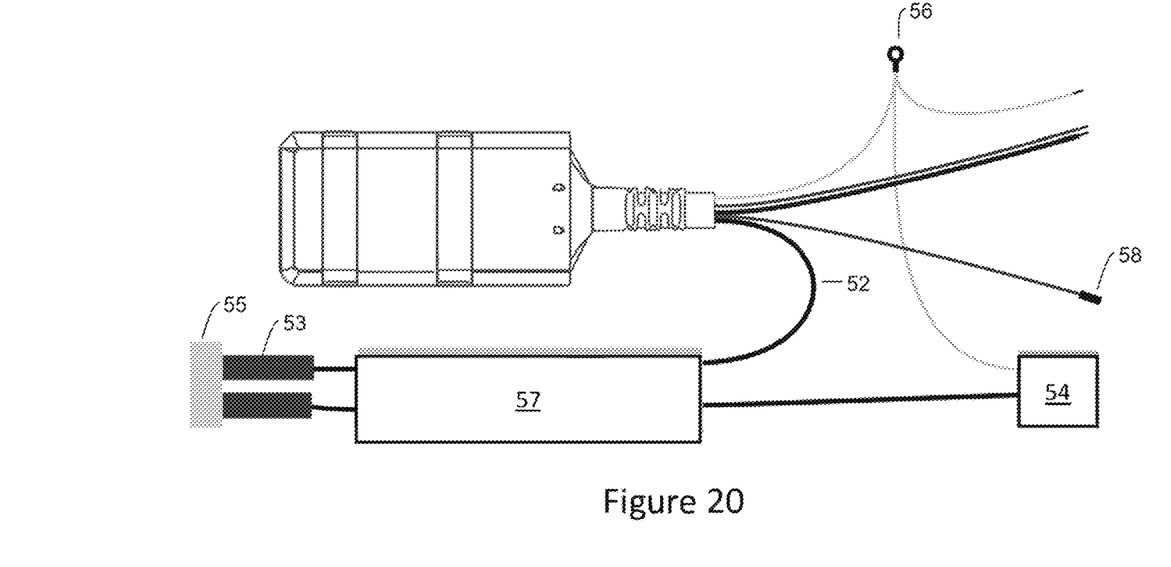
FIG. 20 shows loom details of an embodiment of a brake controller for installation with a towbar having no powered connector.

An alternate embodiment is shown in FIG. 20 for fitment to a towbar which may have a custom loom with equal lengths of wire from the connector 44 to ends terminated with ferrules 51 for wires which go directly to an unpowered connector (such as a 7-pin trailer connector), being the stop lamp and brake output wires. For the supply wire, it may have a longer wire 52 with a fuse holder 53, suitable for routing along the vehicle to the battery. This supply wire may be bundled in a conduit 57 with a separate supply wire for an auxiliary power connector 54. In this case, the fuse holders for the brake controller and the auxiliary power connector may be bussed together on a bus 55 for the installer's convenience. Alternatively, the longer loom for the power connection may be supplied separately, together with a butt splice and glue-lined heat-shrink, to allow the installer to cut it to length.

Yet another embodiment for fitment to a towbar may have a custom loom to mate with connectors already existing on the vehicle.

Finally, it is to be understood that various alterations, modifications and/or additions may be introduced into the constructions and arrangements of parts previously described without departing from the spirit or ambit of the invention.

The invention claimed is:

1. A brake controller for a towed vehicle braking system, wherein the towed vehicle has combined brake and turn lights activated by combined light signals from a towing vehicle, said brake controller configured to generate a braking control signal to the towed vehicle braking system, the brake controller including:
   an inertial sensor including plural sensor axes for generating sensor data associated with each sensor axis;
   a processor for processing said sensor data to estimate a deceleration of the towing vehicle; and
   a housing including an input connector for electrical connection to a towing vehicle and an output connector for electrical connection to a towed vehicle,
   wherein the housing is adapted to be mounted to the towing vehicle,
   wherein the inertial sensor and the processor are housed within the housing, and the brake controller is electrically connected to the towing vehicle via the input connector and to the towed vehicle via the output connector, and wherein the output connector includes an output socket adapted to receive a plug from the towed vehicle,
   whereby the brake controller is configured to generate and output the braking control signal to control activation of brakes of the towed vehicle braking system based on the deceleration of the towing vehicle estimated by the processor and a brake light signal determined by the processor from received combined light signals from the towing vehicle via the input connector,
   wherein the brake controller receives power via the input connector for some or all components of the brake controller and for auxiliary devices of the towed vehicle, and
   wherein the processor monitors current drawn by the auxiliary devices of the towed vehicle, and the brake controller reserves current for braking control by disconnecting one or more auxiliary devices or trailer lighting circuits.

2. A brake controller according to claim 1, wherein the output socket is further adapted to receive an output adapter that is adapted to receive a further plug from the towed vehicle.

3. A brake controller according to claim 1, wherein the output socket includes a first output socket adapted to receive a first plug from the towed vehicle and a second output socket adapted to receive a second plug from the towed vehicle.

4. A brake controller according to claim 1, wherein the input connector includes an input plug adapted to be received by a towed vehicle connection socket on the towing vehicle, thereby mounting the housing to the towing vehicle.

5. A brake controller according to claim 1, wherein the housing and the output socket form a towed vehicle connection socket on the towing vehicle.

6. A brake controller according to claim 1, wherein an input socket is further adapted to receive an input adapter that is adapted to be received by a further socket on the towed vehicle.

7. A brake controller according to claim 1, wherein the brake controller further includes pins disposed between the input connector and the output connector, and the processor and the inertial sensor are implemented in a module having a Printed Circuit Board (PCB), wherein the pins terminate at the PCB.

8. A brake controller according to claim 7, wherein the module and the pins that terminate at the PCB are housed within the housing.

9. A brake controller according to claim 7, wherein the pins terminate at the PCB into holes in the PCB being sized to provide an interference fit with the pins, thereby providing electrical connection and mechanical support to the PCB.

10. A brake controller according to claim 1, wherein the brake controller further includes power electronics, in communication with the processor, configured to output the braking control signal to control activation of the brakes of the towed vehicle braking system.

11. A brake controller according to claim 10, wherein the brake controller further includes a brake light circuit having an isolation transistor configured to be turned OFF when the braking control signal is outputted by the power electronics to prevent the towing vehicle from detecting that brake lights of the towed vehicle are turned ON.

12. A brake controller according to claim 11, wherein the brake controller determines the brake light signal from the combined light signals from the towing vehicle when a threshold voltage is detected as being exceeded from the combined light signals.

13. A brake controller according to claim 1, wherein the brake controller further includes a safety controller configured to generate and output the braking control signal to control activation of the brakes of the towed vehicle braking system if the processor fails.

14. A brake controller according to claim 1, wherein the processor implements a lighting control module configured to generate and output a towed vehicle brake light signal to control activation of brake lights of the towed vehicle when the brake light signal is determined by the processor.

15. A brake controller according to claim 1, wherein the input connector includes a fuse.

16. A brake controller according to claim 11, wherein the processor detects water immersion of the output connector and the brake controller disables current to trailer circuits if detected.

17. A brake controller according to claim 1, wherein the processor implements a wireless module configured to provide data communication between the processor and an external computing device.

18. A brake controller according to claim 1, wherein the brake controller further includes one or more LEDs and the processor is further configured to illuminate the one or more LEDs to communicate information to a user of the brake controller.

19. A brake controller according to claim 17, wherein the brake controller is further configured to estimate one or more characteristics of circuits associated with activation of brake lights of the towed vehicle and or brakes of the towed vehicle, and wherein the one or more characteristics include a fingerprint corresponding to the towed vehicle that is used to automatically identify the towed vehicle.

20. A brake controller according to claim 19, wherein the processor communicates the fingerprint and associated configuration data of the towed vehicle braking system to the external computing device via the wireless module.

21. A brake controller for a towed vehicle braking system, wherein the towed vehicle has combined brake and turn lights activated by combined light signals from a towing vehicle, said brake controller configured to generate a braking control signal to the towed vehicle braking system, the brake controller including:
  a module having an inertial sensor including plural sensor axes for generating sensor data associated with each sensor axis and a processor for processing said sensor data to estimate a deceleration of the towing vehicle; and
  a loom including at least one input connector for electrical connection to a towing vehicle at one end of the loom and an output connector for electrical connection to a towed vehicle at an opposed end of the loom,
  wherein the brake controller is electrically connected to the towing vehicle via the input connector and to the towed vehicle via the output connector, and
  wherein the output connector includes an output socket adapted to receive a plug from an adapter which then receives a plug from the towed vehicle,
  whereby the brake controller is configured to generate and output the braking control signal to control activation of brakes of the towed vehicle braking system based on the deceleration of the towing vehicle estimated by the processor and a brake light signal determined by the processor from received combined light signals from the towing vehicle via the input connector,
  wherein the brake controller receives power via the input connector for some or all components of the brake controller and for auxiliary devices of the towed vehicle, and
  wherein the processor monitors current drawn by the auxiliary devices of the towed vehicle, and the brake controller reserves current for braking control by disconnecting one or more auxiliary devices or trailer lighting circuits.

22. A brake controller according to claim 21, wherein the processor and the inertial sensor are implemented on a Printed Circuit Board (PCB) of the module, and wherein wire ends of the loom connect electrically to the PCB and are encapsulated separately to the enclosure containing the PCB.

23. A brake controller according to claim 22, wherein the module and at least part of the wires of the loom that terminate at the PCB are over-moulded or potted, thereby providing insulation and mechanical support to the module.

24. A brake controller according to claim 21, wherein the loom brake controller further includes an equaliser adapted to reduce effects of sway and vibration of the loom based on the sensor measurements.

* * * * *